No. 628,374. Patented July 4, 1899.
J. H. VANDERBURGH.
CLOTH MEASURING MACHINE.
(Application filed Mar. 18, 1898.)
(No Model.) 3 Sheets—Sheet 1.
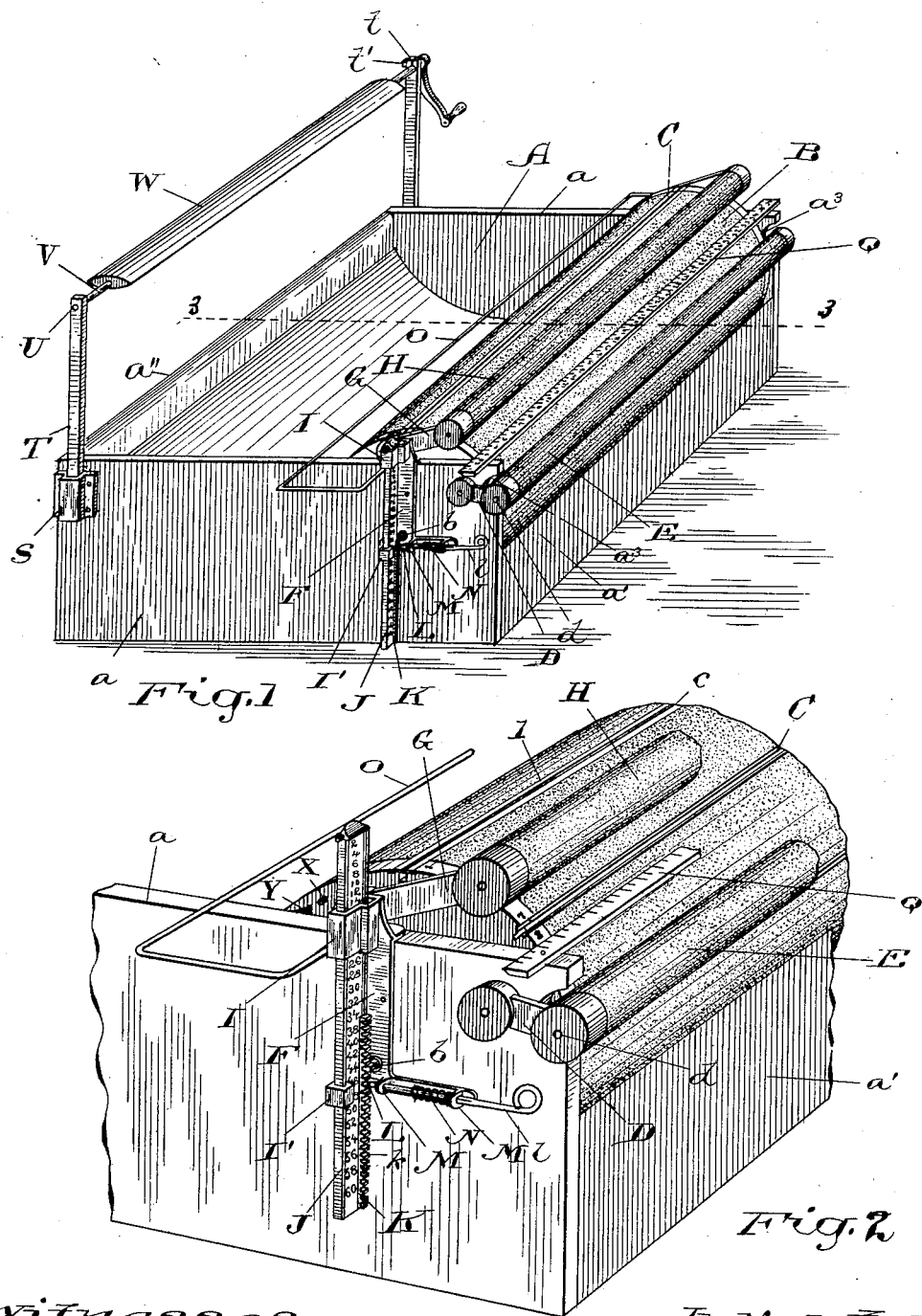
Witnesses
J. E. Cameron
J. F. Riggs
Inventor
J. H. Vanderburgh
by C. H. Nichols
his attorney
THE NORRIS PETERS CO., PHOTO-LITHO., WASHINGTON, D. C.

No. 628,374. Patented July 4, 1899.
J. H. VANDERBURGH.
CLOTH MEASURING MACHINE.
(Application filed Mar. 18, 1898.)
(No Model.) 3 Sheets—Sheet 2.
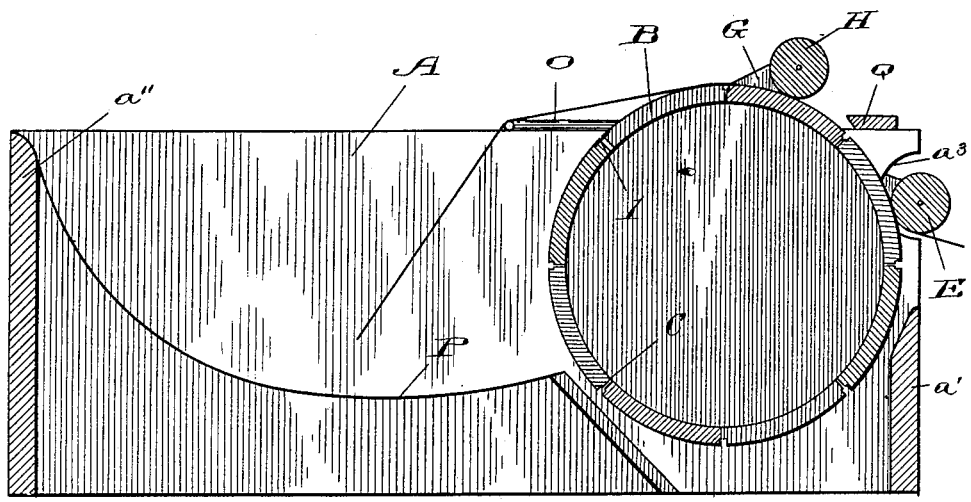
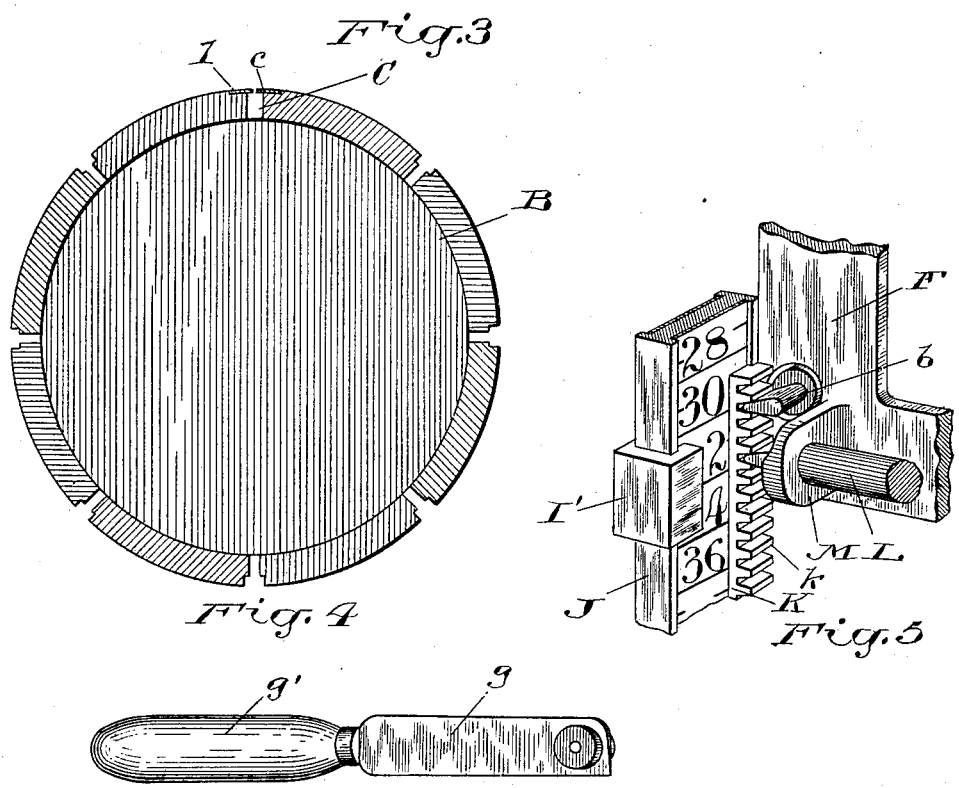
Witnesses
Inventor No. 628,374. Patented July 4, 1899.
J. H. VANDERBURGH.
CLOTH MEASURING MACHINE.
(Application filed Mar. 18, 1898.)
(No Model.) 3 Sheets—Sheet 3.

Witnesses Inventor

UNITED STATES PATENT OFFICE.

J HARVEY VANDERBURGH, OF MOUNTSBERG, CANADA.

CLOTH-MEASURING MACHINE.

SPECIFICATION forming part of Letters Patent No. 628,374, dated July 4, 1899.

Application filed March 18, 1898. Serial No. 674,380. (No model.)

*To all whom it may concern:*

Be it known that I, J HARVEY VANDERBURGH, of Mountsberg, in the county of Wellington and Province of Ontario, Canada, have invented certain new and useful Improvements in Cloth-Measuring Machines; and I hereby declare that the following is a full, clear, and exact description of the same.

In measuring cloth with a yardstick there is always a certain amount of loss of material, which cannot be avoided, varying from half an inch in the yard upward. This loss, if taken note of, would at the end of a year in a large establishment represent a considerable sum of money. The measuring of cloth with a yardstick consumes a considerable portion of the salesman's time and requires a large counter area to accommodate that portion of the goods measured off. After the goods have been measured with a yardstick it is necessary for the salesman to fold them for the customer. Under the method of measuring goods with a yardstick it is necessary first to unfold the goods, then measure them, and afterward fold what has been measured off.

The object of this invention is to devise a machine by means of which a saving may be effected in the goods and in the space and time required to measure the goods, and to so arrange this machine that each yard will be recorded as it is measured off and the total number of yards and fraction of the last yard measured indicated by it, and to provide the machine with a web-holder by means of which the web of cloth can be held in such a manner that it will unwind itself during the passage of the goods through the measuring apparatus, the whole device being hereinafter fully set forth, and more particularly pointed out in the claim.

Figure 7:
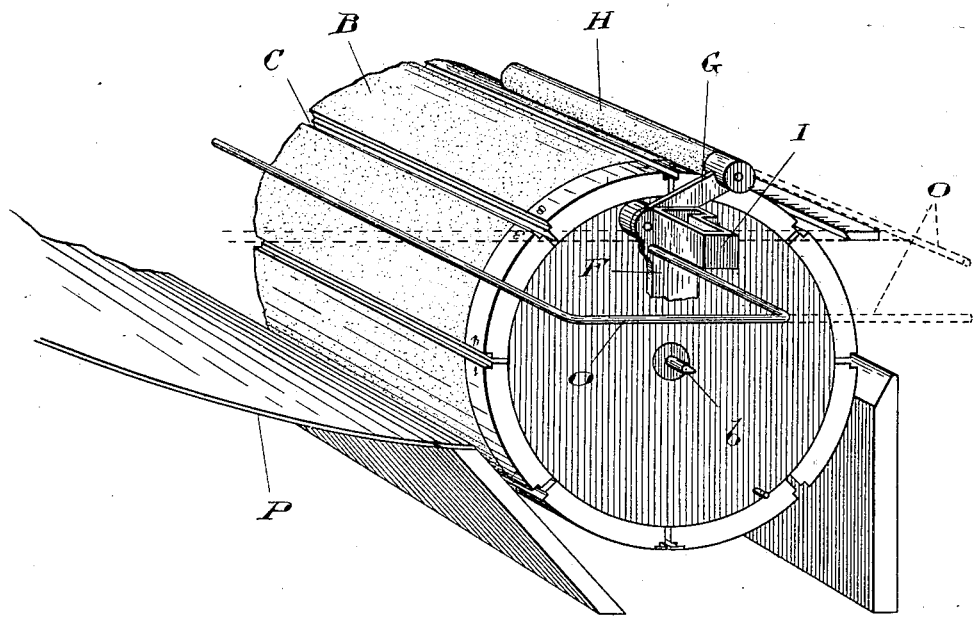
Figure 6:
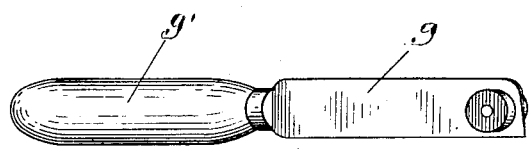

In the drawings, Figure 1 is a perspective view of the complete machine. Fig. 2 is a similar view showing the registering mechanism recording fourteen yards. Fig. 3 is a transverse sectional view on the lines 3 3, Fig. 1. Fig. 4 is an enlarged sectional view of the measuring-drum. Fig. 5 is an enlarged perspective view of the registering apparatus. Fig. 6 is a view of the knife; and Fig. 7 is a skeleton view of the frame and measuring-roll, showing the swinging bail on one side of the measuring-roll and in dotted lines on the other side.

Like letters of reference refer to like parts throughout the specification and drawings.

The machine embraces in its construction a substantially rectangular-shaped case A, consisting of two opposite sides $a\ a$, a front $a'$, and a back $a''$. The top of the back $a''$ is level with the top of the sides $a\ a$, while the front $a'$ extends only half-way to the top of the sides $a\ a$. The front ends of the sides $a\ a$ intermediate the top of the front $a'$ and the top of the sides are each provided with a semicircular recess $a^3$, which recesses are in horizontal alinement.

B represents a drum slightly less in length than the distance between the inner faces and the sides $a\ a$. The drum B measures exactly thirty-six inches in circumference in order that one revolution of the drum will take place while one yard of material is passing through the machine. The ends of the drum B are fitted with spindles $b\ b$, respectively, which are journaled in the sides $a\ a$ in such relation to their ends that the perimeter of the drum B when assembled in position is in juxtaposition to the top of the front $a'$. The drum B is provided with eight longitudinal grooves C, extending from end to end. Each edge of each groove is provided with a metallic plate $c$, slightly within the perimeter of the drum. The opposed edges of the plate $c$ of each groove are separated from each other a distance slightly greater than the thickness of an ordinary cutting-knife. The ends of the grooves C are considerably enlarged for the purpose hereinafter set forth.

Pivoted to each side $a$ in alinement with its respective recess $a^3$ is one end of a link D, while the opposite end of the link projects beyond the edge of the recess. Journaled in the projecting ends of the links D are the spindles $d$ of a friction-roll E, the surface of which is covered with green baize, felt, or other frictional material. The roll E normally bears against the drum B.

Connected to each side $a$ is a strap F, the lower end of each of which is provided with a hole through which pass the spindles $b\ b$. The upper end of each strap F projects above the top of its respective side, and pivoted to the projecting part of each of the straps F is one end of a link G, and journaled in the opposite ends of the links G is a friction-roll H, covered with green baize, felt, or other frictional material.

The frictional rolls E and H are preferably of the same diameter and length and normally rest against the perimeter of the drum in order that they can press the material to the drum during its passage through the machine.

The outer side face of the strap F at one end of the machine is provided with two guides I I', respectively, one located at the top and the other at the bottom of the strap and in vertical alinement. Vertically moving in the guides I and I' is a bar J, provided with a rack K, the teeth $k$ of which engage the end of the spindle $b$ of the drum B. The end of the spindle $b$ is tooth-shaped to engage the teeth $k$ of the rack K during the revolution of the drum. Each revolution of the drum causes the tooth-shaped spindle $b$ to raise the bar J a distance of one tooth. The bar J is provided with a dial or numbered spaces, the width of the spaces being equal to the pitch of the teeth of the rack, each space being numbered as shown in the drawings. The top of the bar J is provided with two lugs, which rest on the top of the upper guide I when the bar is in its lowered or starting position. When the bar J is in its lowered position, no figures are visible above the top of the guide I. The first revolution of the drum causes the toothed spindle $b$ to raise the rack and bar a distance of one space, which is immediately visible above the top of the guide, indicating the fact that one yard has been measured off. The second revolution of the drum causes the spindle to raise the rack and bar the distance of another tooth, indicating the fact that two yards have been measured off, this being repeated until the required number of yards have been measured. To prevent the return of the bar J to its lowered or starting position when the toothed spindle is disengaged from the rack, I provide a detent-pawl L to engage the teeth of the rack. This detent-pawl L consists of a metallic bar sliding in horizontal guides M, connected to the strap F at the same end of the machine as the bar J.

Encircling the detent-pawl L is a spring N, which bears against a pin passing through the pawl and against the inner side of the adjacent guide M, the tendency of the spring being to hold the detent-pawl normally in engagement with the teeth of the rack. The shank $l$ of the detent-pawl L projects nearly to the front of the adjacent side $a$, and is hook-shaped to provide a finger-grip for the salesman. By drawing the detent-pawl L toward the front of the machine the toothed end is disengaged from the rack, which disengagement permits of the descent of the bar J to its normal or starting position.

The drum B, as before stated, is provided with eight longitudinal grooves C, extending from end to end of the same and arranged at equidistant intervals from each other. Each of these grooves represents one-eighth of a yard and is numbered regularly from one-eighth to one yard.

O represents a substantially rectangular-shaped guard in the form of a swinging bail, the ends of which are detachably connected to the straps F at the rear of the registering-bar J by being inserted in holes F'' in the strap. This bail when in its operative position is located between the drum and the back $a''$ of the case to prevent the material being measured coming into contact with the lower part of the drum and when not in its operative position is swung to the rear of the measuring-drum with its side close to the measuring-stick to be out of the way.

Connected to the bottom of the sides $a\ a$ and to the back $a''$ at the rear of the drum B is a skeleton frame P, the top of which is concaved and covered with leather or other similar material or, if necessary, with wood, to provide a concave-shaped support for the material being measured. In the case of single-width goods the web is thrown into the case A upon the top of the skeleton frame P and is passed over the guard O and drum B and under the friction-rolls E and H. The drum B, being covered with baize, felt, or other frictional material, is caused to revolve as the goods are drawn through the machine by the salesman. The drawing of the goods causes the web to unwind and the number of yards drawn through to be simultaneously registered on the registering-bar, the salesman at the same time folding the goods as he draws them through. If any fraction of a yard is to be cut, the material is passed through the machine in the same manner and the number of eighths of yards covered by the material between the under side of the frictional roll E and the groove opposite the registering-bar J counted, which would indicate the fraction of a yard sold.

By so arranging the machine that the goods can be thrown into the case and passed over the drum, registered on the registering-bar, and folded by the salesman he is enabled to perform in one movement what previously required three distinct movements and is enabled to measure the goods accurately. By arranging the machine in this manner a saving of space is effected, as the whole operation of unwinding, measuring, and refolding is done in a space slightly greater than the width of the goods and loss is prevented by either miscount in the number of yards on the salesman's part or by waste in measuring and cutting. Any inexperienced salesman or child can operate the machine and measure off any given quantity of goods as accurately as any experienced salesman and more accurately than by the aid of a yardstick.

The machine is preferably fitted into the counter at a convenient point, with the frictional rolls or front contiguous to the inner side of the counter, or that part of the counter at which is situated the salesman.

In order to provide a means for measuring tape, ribbons, or other goods which could not be conveniently measured by the machine, I fasten to the top sides $a$ $a$, at the front of the drum, a yardstick Q.

Connected to the sides $a$ $a$ contiguous to the top of the back are two sockets S, which are adapted to receive removable standards T, the top end of each of which is fitted with a hole U to receive the spindle V of a winding-roll W. One of the standards T is provided with a saw-cut $t$, extending from the top of the standard to the hole U and with a set-screw $t'$ passing through the forks of the standard formed by the saw-cut, the purpose of the screw being to compress the forks and diminish the size of the hole U in order that a breaking force can be applied to the spindle V.

In stock-taking the goods can be unwound from the web in the case and wound on the winding-roll W and then passed through the machine, measured, and rewound on the original board.

To prevent the reverse revolution of the drum, there is connected to one side of it a stop or lug X, which is adapted to engage a resisting-spring Y, connected to the inner face of the adjacent side $a$. This lug and resisting-spring are so arranged in relation to the machine that the groove marked "one yard" is opposite the registering-bar when the lug engages the resisting-spring to enable the salesman to start the revolution of the drum correctly.

The measuring-machine is preferably set in the counter, which is cut away to receive it, so that the top of the drum and the friction-roll H are the only parts of the apparatus above the top of the counter. The use of an apparatus of this kind, as before stated, effects a saving in time, labor, and space.

The cutting-knife consists of a blade $g$, a handle $g'$, and two rollers, one mounted on each side of the cutting-blade to travel against the under side of the guide-plates.

The guard or bail U is used when measuring loose or folded goods—that is, goods which are not wound on a board or web and which are placed in the concaved receptacle for that purpose. To readily distinguish the starting-point of the drum B, the groove marked "one yard" has a tape at each side of it of a different color from the baize or frictional covering for the drum (which may be of any color) and a different color from the strips at the sides of the remaining grooves. The guide-plates at each groove may be on either the inner or outer surfaces of the drum and are only put on such machines as may be ordered to be manufactured in this way. Where the guide-plates are not used, the plain grooves are left, so that scissors can be employed to cut the material.

Having thus fully described my invention, what I claim as new, and desire to secure by Letters Patent, is—

A cloth-measuring machine embracing in its construction a substantially rectangular-shaped case, a measuring-drum, spindles fitted to the ends of the drum and journaled in bearings in the sides of the case, a plurality of longitudinal grooves in the perimeter of the drum extending from end to end thereof dividing the drum into fractions of a yard, a friction-roller journaled in swinging links connected to the top of the sides of the case close to the measuring-drum, links connected to the front of the sides of the case, a friction-roller journaled in the links, a yardstick connected to the front of the sides of the case close to the measuring-drum, guides connected to the sides of the case, a registering-dial sliding in the guides, a dog fitted to the adjacent spindle of the measuring-drum to engage the teeth of the rack to raise it a predetermined distance on each revolution of the drum, a detent-pawl to engage the rack, and a bail pivotally connected to the sides of the case and arranged to be swung to either side of the measuring-drum, substantially as specified.

Mountsberg, Canada, March 3, A. D. 1898.

J HARVEY VANDERBURGH.

In presence of—
GEO. S. VIESS,
W. DUNN.